(12) United States Patent
Grabowski et al.

(10) Patent No.: US 9,937,848 B1
(45) Date of Patent: Apr. 10, 2018

(54) MOUNTING BRACKET FOR COUPLING ELONGATE MEMBERS

(71) Applicant: GM GLOBAL TECHNOLOGY OPERATIONS LLC, Detroit, MI (US)

(72) Inventors: Thomas P. Grabowski, Shelby Township, MI (US); Mark A. Pulleyblank, Harrison Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/469,940

(22) Filed: Mar. 27, 2017

(51) Int. Cl.
  *B60P 7/08* (2006.01)
  *B60P 7/15* (2006.01)
(52) U.S. Cl.
  CPC ..................... *B60P 7/15* (2013.01)
(58) Field of Classification Search
  CPC ........... B60P 7/15; B60P 7/135; B60P 7/0815; B60P 3/007
  USPC .......................... 410/121, 143, 150, 152, 153
  See application file for complete search history.

(56) References Cited

U.S. PATENT DOCUMENTS

| | | | | |
|---|---|---|---|---|
| 4,343,578 A | * | 8/1982 | Barnes | B60P 7/15 410/143 |
| 4,650,383 A | * | 3/1987 | Hoff | B60P 7/15 410/149 |
| 7,464,976 B2 | * | 12/2008 | Smith | B60R 9/00 296/26.11 |
| 9,580,004 B2 | * | 2/2017 | Puchkoff | B60P 7/0815 |

* cited by examiner

*Primary Examiner* — Stephen Gordon

(57) ABSTRACT

An assembly includes a first elongate member having a periphery. The assembly also includes a bracket. The bracket has a first component and a second component. The first component is disposed about a first portion of the periphery and the second component is disposed about a second portion of the periphery. The first component is snap-fit to the second component to secure the first elongate member between the first component and the second component. The assembly additionally includes a second elongate member coupled to the bracket.

10 Claims, 3 Drawing Sheets

MOUNTING BRACKET FOR COUPLING ELONGATE MEMBERS

TECHNICAL FIELD

The present disclosure relates to elongate member assemblies. More particularly, the present disclosure relates to an assembly of a cross member to a pair of rails on an automotive vehicle.

INTRODUCTION

Automotive vehicles, such as pickup trucks, may be provided with elongate rail members for supporting loads, hand-holds, or other purposes. Some users may desire to mount orthogonal cross members to the elongate rail members in order to better carry a variety of equipment.

SUMMARY

An assembly according to the present disclosure includes a first elongate member having a periphery. The assembly also includes a bracket. The bracket has a first component and a second component. The first component is disposed about a first portion of the periphery and the second component is disposed about a second portion of the periphery. The first component is snap-fit to the second component to secure the first elongate member between the first component and the second component. The assembly additionally includes a second elongate member coupled to the bracket.

In an exemplary embodiment, the first elongate member has a circular cross-section. In such embodiments, the first component includes a first sidewall, a second sidewall, and a first arcuate portion joining the first sidewall and second sidewall, and the second component includes a second arcuate portion. The first elongate member is secured between the first arcuate portion and the second arcuate portion.

In an exemplary embodiment, the second component includes a resilient member having an undeflected position and a deflected position, the resilient member being configured to move from the undeflected position to the deflected position in response to the second component being disposed about the second portion of the periphery to thereby inhibit movement of the bracket relative to the first elongate member.

In an exemplary embodiment, the assembly additionally includes a fastener coupling the second elongate member to the second component. In such embodiments, the first component may have a first fastener opening and the second component may have a second fastener opening in register with the first fastener opening, with the fastener disposed through the first fastener opening and the second fastener opening.

In an exemplary embodiment the first component and the second component comprise a resilient plastic material.

In an exemplary embodiment, the first component and the second component are discrete and separable components.

In an exemplary embodiment, the second elongate member has a central axis extending orthogonal to a central axis of the first elongate member.

In an exemplary embodiment, the assembly additionally includes a vehicle with a first body panel disposed on a driver side of the vehicle and a second body panel disposed on a passenger side of the vehicle, a third elongate member, and a second bracket. In such an embodiment, the first elongate member is coupled to the first body panel, the third member is coupled to the second body panel, and the second bracket couples the second rail member to the third rail member.

In an exemplary embodiment, the first component includes an aperture and the second component includes a resilient cantilever projection disposed at least partially within the aperture.

A bracket according to the present disclosure includes a first component and a second component. The first component includes a first sidewall, a second sidewall, and a first arcuate portion coupling the first sidewall to the second sidewall. The second component is snap-fit to the first component. The second component has a mounting portion and a second arcuate portion. The first arcuate portion and second arcuate portion define an opening for receiving a first elongate member. The mounting portion is mountable to a second elongate member.

In an exemplary embodiment, the second component includes a resilient member having an undeflected position and a deflected position. The resilient member is configured to move from the undeflected position to the deflected position in response to the second component being disposed about an elongate member.

In an exemplary embodiment, the mounting portion includes at least one fastener hole for receiving a fastener. In such an embodiment, the first component may include a second mounting portion with a second mounting hole, with the second mounting hole being in register with the mounting hole.

In an exemplary embodiment, the first component and the second component comprise a resilient plastic material.

In an exemplary embodiment, the first component and the second component are discrete and separable components.

In an exemplary embodiment, the first component includes an aperture and the second component includes a resilient cantilever projection disposed at least partially within the aperture.

A method of coupling elongate members according to the present disclosure includes providing a first elongate member, a second elongate member, a first bracket component, and a second bracket component. The method additionally includes disposing the first bracket component about a first portion of a periphery of the first elongate member. The method also includes disposing the second bracket component about a second portion of the periphery of the first elongate member. The method further includes snap-fitting the second bracket component to the first bracket component to secure the first elongate member between the first bracket component and the second bracket component, and coupling the second elongate member to the second bracket component.

In an exemplary embodiment, the second component includes a resilient member having an undeflected position and a deflected position. In such an embodiment, disposing the second bracket component about a second portion of the periphery of the first elongate member includes moving the resilient member from the undeflected position to the deflected position to thereby inhibit movement of the second component relative to the first elongate member.

In an exemplary embodiment, the first component includes an aperture and the second component includes a resilient cantilever projection. In such an embodiment, snap-fitting the second bracket component to the first bracket component includes disposing the resilient cantilever projection at least partially within the aperture.

Embodiments according to the present disclosure provide a number of advantages. For example, the present disclosure provides a system and method for quickly and easily assembling a cross-bar to a bed rail on a vehicle, increasing user satisfaction.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the exemplary aspects of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
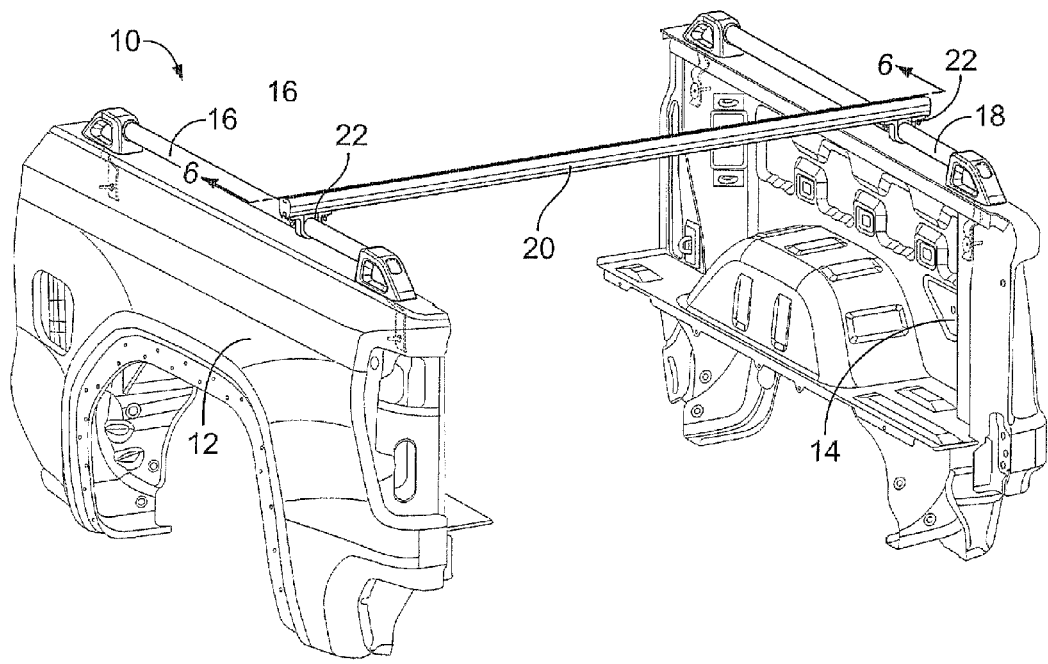
FIG. 1 is a view of a vehicle assembly according to the present disclosure.

Referring now to FIG. 1, a vehicle assembly 10 is shown. In this embodiment, the vehicle is a pickup truck having a driver-side bed panel 12 and a passenger-side bed panel 14. A driver-side bed rail 16 is provided at an upper portion of the driver-side bed panel 12, and a passenger-bed rail 18 is provided at an upper portion of the passenger-side bed panel 14. The driver-side bed rail 16 and passenger-side bed rail 18 are elongate members provided for supporting loads, handholds, or other similar purposes. The driver-side bed rail 16 and passenger-side bed rail 18 extend generally longitudinally, i.e. in a fore-aft direction of the vehicle.

A cross-member 20 is coupled to the driver-side bed rail 16 and passenger-side bed rail 18. The cross-member 20 is an elongate member extending generally laterally, i.e. from the driver side to the passenger side. While only one cross-member 20 is illustrated, multiple cross-members 20 may be provided. The cross-member(s) 20 may be provided for supporting a load directly, or one or more racks, e.g. a bicycle rack, may be coupled to the cross-member(s) 20 to support a load. In a preferred embodiment, the cross-member 20 is an extruded member having at least one slot for receiving a fastener, as will be discussed in further detail below. The cross-member 20 is coupled to the driver-side bed rail 16 and the passenger-side bed rail 18 via first and second bracket assemblies 22.

Figure 2:
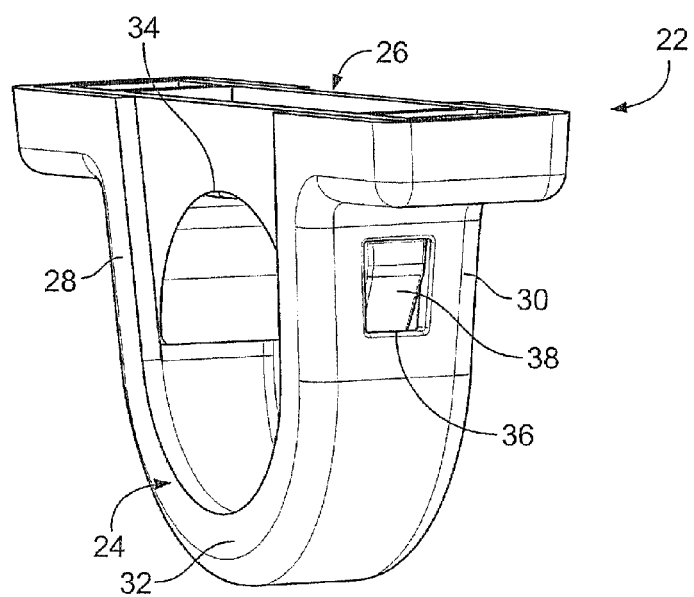
FIG. 2 is an isometric view of a bracket according to the present disclosure.
Figure 3:
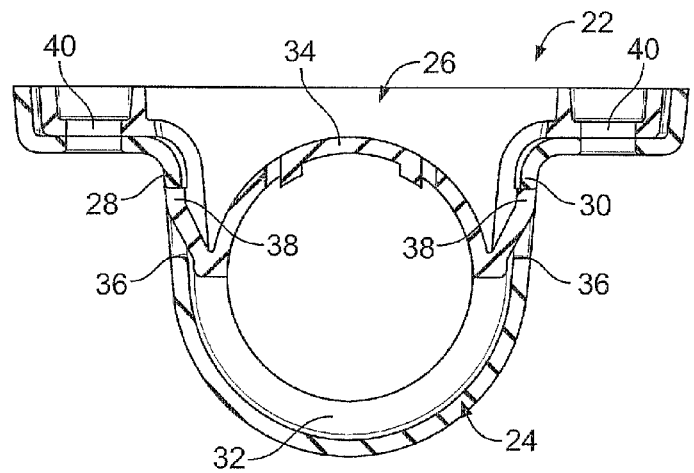
FIG. 3 is a top view of a bracket according to the present disclosure.
Figure 4:
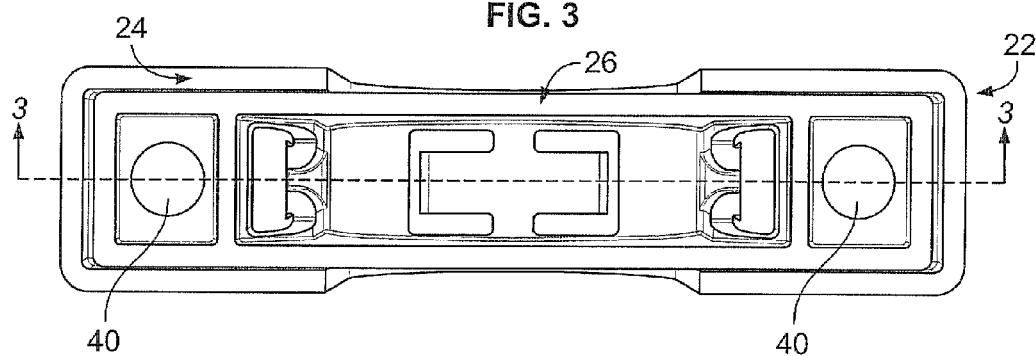
FIG. 4 is a cross-section view of a bracket according to the present disclosure.

Referring now to FIGS. 2-4, a bracket assembly 22 is shown in further detail. The bracket assembly 22 includes a first component 24 and a second component 26. The first component 24 and the second component 26 are discrete components which may be snap-fit together, as will be discussed in further detail below.

The first component 24 has a generally U-shaped profile, with a first sidewall 28, a second sidewall 30, and an arcuate endwall 32. The second component 26 has an arcuate portion 34. When the first component 24 is coupled to the second component 26, the arcuate endwall 32 and arcuate portion 34 cooperatively define a generally circular profile.

The first component 24 is provided with at least one aperture 36 in the first sidewall 28, the second sidewall 30, or both. The second component is provided with at least one resilient cantilever projection 38 in a location corresponding to the aperture 36. In this embodiment, two apertures 36 and two projections 38 are provided. The cantilever projections 38 may be snap-fit into engagement with the apertures 36 to secure the first component 24 to the second component 26.

At least one fastener hole 40 extends through the first component 24 and second component 26. In the embodiment of FIGS. 2-4, two fastener holes 40 are provided. However, in other embodiments a different number of fastener holes 40 may be provided.

Figure 5:
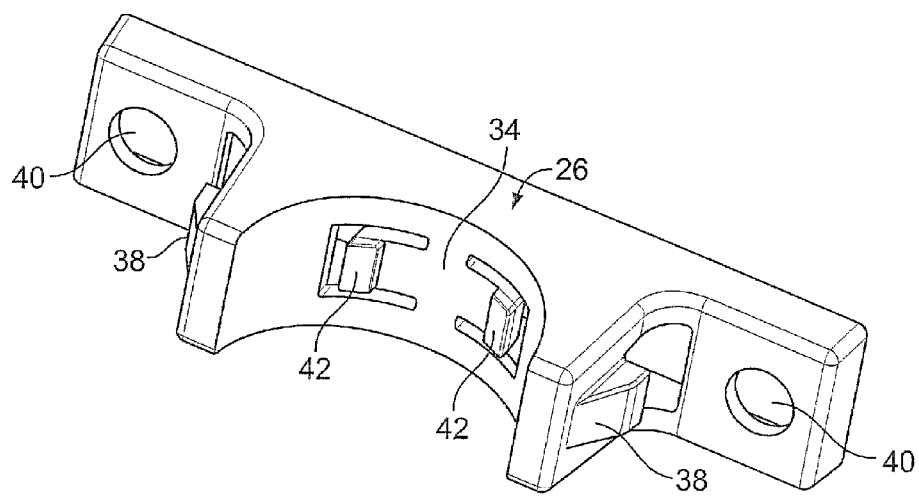
FIG. 5 is an isometric view of a bracket component according to the present disclosure.

Referring now to FIG. 5, the second component 26 is shown in further detail. The second component 26 is provided with at least one resilient member 42. In the embodiment of FIGS. 2-5, two resilient members 42 are provided; however, in other embodiments a different number of resilient members 42 may be provided. The resilient members 42 extend radially inward from the arcuate portion 34. The resilient members 42 are illustrated here in an undeflected state. When disposed about a circular tubular member, the resilient members 42 may deflect and exert a frictional force on the tubular member to inhibit motion of the second component 26 relative to the tubular member, as will be discussed in further detail below.

Figure 6:
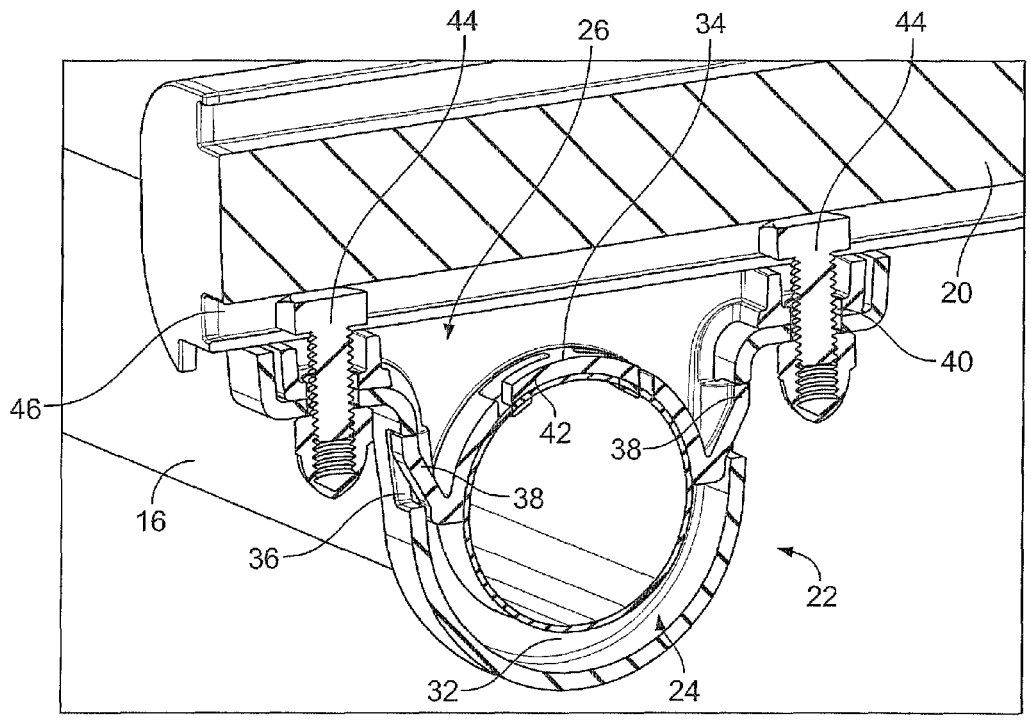
FIG. 6 is a view of an elongate member assembly according to the present disclosure.

Referring now to FIG. 6, an assembly according to the present disclosure is illustrated in cross-section. The first component 24 and second component 26 of the bracket assembly 22 are disposed about the driver-side bed rail 16 and snap-fit together by engagement of the cantilever projections 38 and apertures 36. The driver-side bed rail 16 is retained between the arcuate endwall 32 of the first component 24 and the arcuate portion 34 of the second component 26. The resilient members 42 are deflected by contact with the driver-side bed rail 16, and in response exert a frictional force on the driver-side bed rail 16 to inhibit motion of the bracket assembly 22 relative to the driver-side bed rail 16.

The cross-member 20 is secured to the bracket assembly 22 by at least one fastener 44. In this embodiment, two fasteners 44 are illustrated as bolts and nuts. However, in other embodiments different numbers or types of fasteners may be used. The fasteners 44 may be inserted into a slot 46 in the cross-member 20, and subsequently fastened to the bracket assembly via the fastener holes 40.

As may be seen, an assembly according to the present disclosure provides a flexible means of coupling a cross-bar to a tubular member at any position.

Figure 7:
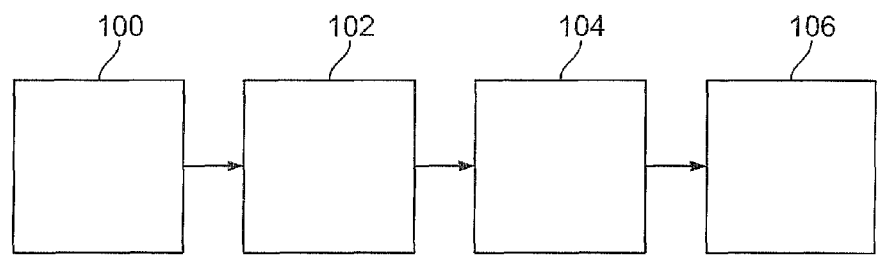
FIG. 7 is a flowchart representation of a method of assembly according to the present disclosure.

Referring now to FIG. 7, a method of assembly according to the present disclosure is illustrated in flowchart form. A first elongate member, second elongate member, first bracket component, and second bracket component are provided, as illustrated at block 100. The first bracket component is disposed about a first portion of the periphery of the first elongate member, and the second bracket component is disposed about a second portion of the periphery of the first elongate member as illustrated at block 102. The second bracket component is snap-fit to the first bracket component to secure the first elongate member between the first bracket component and the second bracket component, as illustrated at block 104. The second elongate member is then coupled to the second bracket component, as illustrated at block 106.

As may be seen, assembly methods according to the present disclosure enable easy coupling of elongate members. Once the first and second components have been snap-fit about the first elongate member, a user need not hold the bracket assembly in place while coupling the second elongate member to the bracket assembly.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An assembly comprising:
    a first elongate member having a periphery;
    a bracket having a first component and a second component, the first component being disposed about a first portion of the periphery and the second component being disposed about a second portion of the periphery, the first component being snap-fit to the second component to secure the first elongate member between the first component and the second component; and
    a second elongate member coupled to the bracket;
    wherein the second component includes a resilient member having an undeflected position and a deflected position, the resilient member being configured to move from the undeflected position to the deflected position in response to the second component being disposed about the second portion of the periphery to thereby inhibit movement of the bracket relative to the first elongate member.

2. The assembly of claim 1, wherein the first elongate member has a circular cross-section, the first component includes a first sidewall, a second sidewall, and a first arcuate portion joining the first sidewall and second sidewall, the second component includes a second arcuate portion, and the first elongate member is secured between the first arcuate portion and the second arcuate portion.

3. The assembly of claim 1, further comprising a fastener coupling the second elongate member to the second component.

4. The assembly of claim 3, wherein the first component has a first fastener opening and the second component has a second fastener opening in register with the first fastener opening, the fastener being disposed through the first fastener opening and the second fastener opening.

5. The assembly of claim 1, wherein the first component and the second component comprise a resilient plastic material.

6. The assembly of claim 1, wherein the first component and the second component are discrete and separable components.

7. The assembly of claim 1, wherein the second elongate member has a central axis extending orthogonal to a central axis of the first elongate member.

8. The assembly of claim 1, further comprising a vehicle with a first body panel disposed on a driver side of the vehicle and a second body panel disposed on a passenger side of the vehicle, a third elongate member, and a second bracket, wherein the first elongate member is coupled to the first body panel, the third elongate member is coupled to the second body panel, and the second bracket couples the second elongate member to the third elongate member.

9. The assembly of claim 1, wherein the first component includes an aperture and the second component includes a resilient cantilever projection disposed at least partially within the aperture to snap-fit the first component to the second component.

10. The assembly of claim 2, wherein the resilient member has a distal end and a proximal end, the proximal end being coupled to the second arcuate portion, the distal end being provided with a finger projecting toward in interior of the second arcuate portion to contact the first elongate member.

* * * * *